United States Patent Office 3,657,195
Patented Apr. 18, 1972

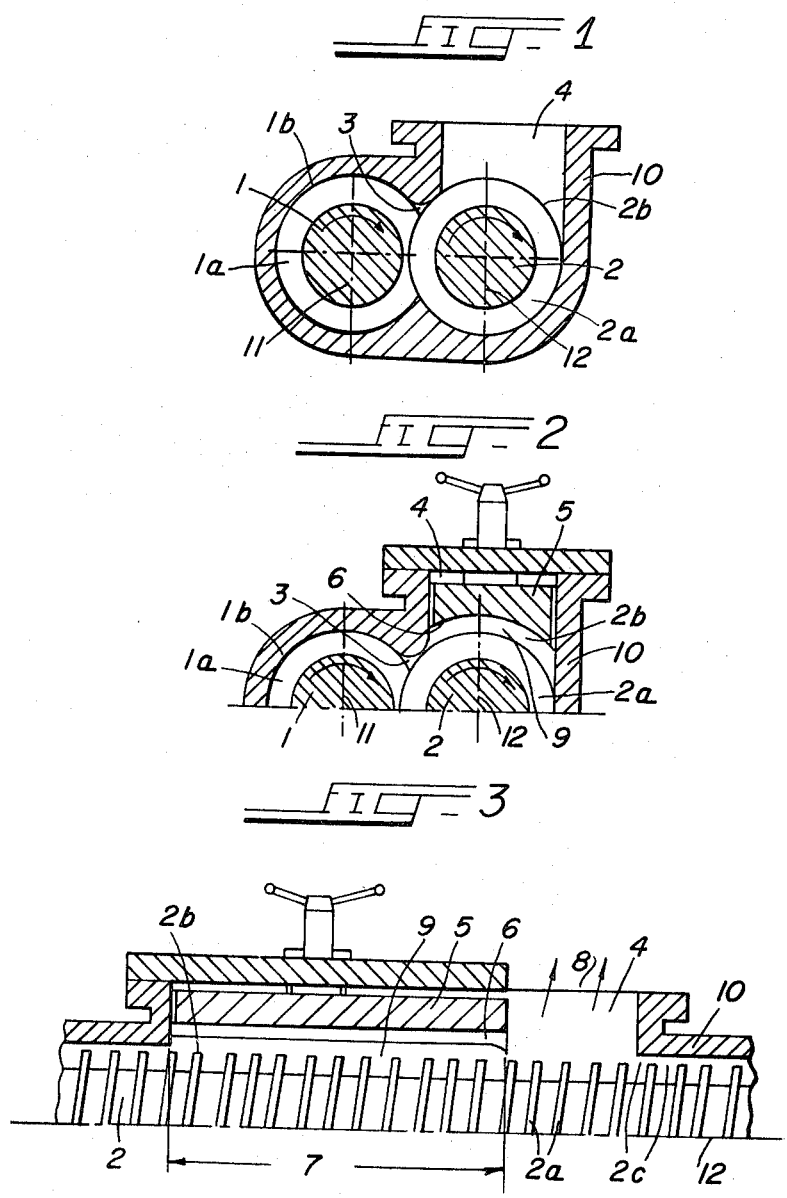

3,657,195
CONTINUOUS PROCESS FOR THE AFTER CONDENSATION OF POLYHEXAMETHYLENE ADIPAMIDE
Helmut Doerfel and Hans Dieter Zettler, Ludwigshafen, Germany, assignors to Badische Anilin- & Soda-Fabrik Aktiengesellschaft, Ludwigshafen (Rhine), Germany
Filed Feb. 19, 1969, Ser. No. 800,554
Claims priority, application Germany, Feb. 22, 1968, P 17 20 349.5
Int. Cl. C08g 20/38
U.S. Cl. 260—78 SC                 3 Claims

ABSTRACT OF THE DISCLOSURE

A process for the production of high molecular weight nylon 6,6 by continuous further condensation of low molecular weight nylon 6,6 in a self-cleaning screw extruder reactor provided with at least one degassing orifice at elevated temperature and a pressure of from 50 mm. Hg to 2 atmospheres gauge and while supplying through the screws an amount of energy of from 0.02 to 0.2 kilowatt hours per kilogram of polyamide.

---

This invention relates to an improved process for the production of high molecular weight nylon 6,6 by continuous further condensation (hereinafter referred to as aftercondensation) of low molecular weight nylon 6,6 (such as is obtained in the conventional pressure condensation of the salt of adipic acid and hexamethylene diamine) in a screw extruder reactor.

The invention further relates to an apparatus for carrying out the process which consists of a self-cleaning closely meshing screw extruder and which is provided with at least one degassing orifice.

The invention also relates to a special arrangement of the degassing opening or openings in the screw extruder as well as a special design of the degassing orifices themselves.

Continuous aftercondensation of low molecular weight polyamides and particularly of nylon 6,6 in screw extruders was first described in principle in U.S. patent specification No. 2,361,717 and in U.K. patent specification No. 674,954. Polyamides prepared by the methods described therein however have relatively low molecular weights.

According to a process described in U.S. patent specification No. 3,040,005, polyamides are melted for aftercondensation in screw extruders in a pressure zone and then kneaded at temperatures of more than 290° C. in vacuo or in a current of inert gas, an amount of energy of at least 0.4 kilowatt per hour per kilogram of polyamide being supplied. Isolation of the solid low molecular weight nylon 6,6 is troublesome however and remelting is attended by thermal damage to the polyamide because it cannot be carried out with complete exclusion of oxygen. Further disadvantages of the said process are the relatively large amount of energy required for aftercondensation and the high reaction temperatures which may also result in thermal damage to the reaction product.

A screw extruder reactor is described in U.S. patent specification No. 3,257,173 which comprises a horizontally disposed single screw and a barrel which has an oval cross-section and surrounds the screw with a small radial clearance in the lower part only. The upper portion of the barrel is formed as a degassing dome over almost the whole length of the screw. It is only at the points where the product is introduced and discharged that the barrel surrounds the screw at the top in the usual manner.

In other prior art embodiments of screw extruders for the said purpose the cylindrical barrel closely surrounds the whole length of a perforated screw or a screw having a recessed core, but such screws only sweep the walls of the barrel and not the relatively large areas of the screw core itself. It is therefore possible for the nylon 6,6 (which is sensitive to elevated temperatures) to be deposited here and to crack; when using such equipment for aftercondensation this may result in discolored high molecular weight nylon 6,6 having undesirable gel-like constituents.

Other single screw extruder reactors for the continuous aftercondensation of polyamides and polyesters are described in Belgian patent specification No. 635,059 and U.S. patent specification No. 3,253,892. These extruders also do not exhibit any self-cleaning of the core and therefore have the said disadvantages in the production of high molecular weight nylon 6,6.

We have now found that nylon 6,6 can be aftercondensed under mild conditions without the said disadvantages by heating low molecular weight nylon 6,6 for from five to forty-five minutes, preferably from ten to thirty minutes, at from 50 mm. Hg to 2 atmospheres gauge, preferably at atmospheric pressure, at from 265° to 290° C., preferably from 270° to 285° C., and a power input through the screws from 0.02 to 0.2, preferably from 0.03 to 0.1, kilowatt hours per kilogram of polyamide in a self-cleaning closely meshing screw extruder reactor provided with at least one degassing orifice for the removal of steam.

According to a particularly advantageous embodiment of the process, molten low molecular weight nylon 6,6 is fed into a screw extruder reactor to be used according to this invention together with from 1 to 10% by weight of steam.

In this case the screw extruder reactor has at least two degassing orifices, one preferably near to the inlet for the product and at least a second preferably in the second third of the barrel in the direction of product flow.

According to this invention the screw extruder reactors for the continuous production of high molecular weight nylon 6,6 are preferably screw extruders having a pair of self-cleaning closely meshing screws rotating in the same direction, for example twin screws of the ZDS-R type or hollow screws of the ZHS type of Werner & Pfleiderer. Twin screw kneader mixers of the ZSK type of Werner & Pfleiderer are also suitable. Other self-cleaning kneaders, such as the Ko-kneader and Colombo twin screw extruders may also be used.

The barrels of the self-cleaning twin screw extruders are advantageously designed so that (apart from the degassing orifices) there is if possible less than 3 mm., preferably less than 1.5 mm. radial clearance between the barrel and the screw lands so that all parts of the barrel are well swept.

The barrel of the screw extruder reactor is preferably provided with more than two degassing orifices equidistantly spaced over the length of the reaction extruder.

FIGS. 1, 2 and 3 of the drawing show diagrammatically how the degassing orifices are located in the closely meshing screw extruder reactors having pairs of screws rotating in the same direction.

FIG. 1 is a cross section through an open degassing orifice. FIG. 2 is a cross section through a degassing orifice which is partly closed by a cover plate which is adjustable in height. FIG. 3 is a longitudinal section through the degassing opening reproduced in FIG. 2.

The reference numerals used have the following meanings:

1 and 2—Extruder screws
1a and 2a—Flanks of screws 1 and 2
1b and 2b—Profile of screws 1 and 2
2c—Flight of screw 2

3—Upper intersection of the two circles which projections of the two screws 1 and 2 give on a plane perpendicular to the screw axes 11 and 12 through the degassing orifice 4
4—Degassing orifice
5—Cover plate
6—Profile of the underside of the cover plate 5
7—Length of hte cover plate 5 and consequently of the zone in which the radial clearance between the barrel 10 and the screw 2 can be varied
8—Escaping steam
9—Radial clearance between the cover plate 5 and the screw 2
10—Barrel
11 and 12—Axes of screws 1 and 2.

The self-cleaning twin screw reactors having pairs of screws rotating in the same direction may advantageously be twin screw extruders modified as shown diagrammatically in FIG. 1. The degassing orifices 4 are arranged over the screw 2 which (when viewed from above) rotates away from the space swept by the two screws 1 and 2 so that the upper intersection 3 of the two circles which the projections of the screws 1 and 2 give on a plane perpendicular to the screw axes 11 and 12 does not lie beneath the degassing orifice 4. This has the advantage that practically no polymer melt can build up on the screw flanks 1a and 2a beneath the degassing orifice. Part of the polymer melt on the screw flanks 1a and 2a would otherwise reach the walls of the degassing orifice 4 and would only be inadequately stripped off therefrom so that the self-cleaning action would be impaired.

It is also advantageous, particularly when separating large amounts of steam from the polymer melt, to cover the degassing orifices 4 provided in the barrel 10 to the extent of from 30 to 70% by a plate 5 which is capable of being moved perpendicularly to the screw axis 12. The lower profile 6 of the cover plate 5 conforms to the profile 2b of screw 2. If the barrel 10 which closely surrounds the screw 2 passes without transition into the degassing orifice 4, there is a risk of spattering of the polymer melt caused by the steam 8 escaping at considerable speed from the flight of screw 2c into the degassing orifices 4. In a zone 7 interposed between the same, in which a clearance between the screw 2 and the barrel 10 which can be adjusted at will (i.e. by the cover plate 5 which is adjustable in the cold) to from 3 to 20 mm., effective separation into two phases takes place. The escaping steam 8 flows at an adjustable, relatively high speed through the not very wide radial clearance 9 and ensures self-cleaning of the machine at this point as well. The clearance between the cover plate 5 and the lands of screw 2 is adjusted so that the escaping steam flows at a speed of from 2 to 5 meters per second through the radial clearance 9. FIG. 2 is a diagrammatic cross section and FIG. 3 is a longitudinal diagrammatic section through a degassing opening constructed as described above.

The process according to this invention is intended particularly for raising the molecular weight of low molecular weight nylon 6,6 such as is obtained for example by precondensation of the salt of adipic acid and hexamethylene diamine in continuous or batch pressure equipment at end pressures of steam of at least 3 atmospheres gauge, preferably of from 4 to 15 atmospheres gauge. A low molecular weight nylon 6,6 having a K value of from 30 to 60, preferably from 40 to 55, (according to H. Fikentscher, Cellulosechemie, 13 (1932) 58) and having a molar ratio of amino terminal groups to carboxyl terminal groups of from 0.5:1 to 1.2:1, preferably of from 0.8:1 to 1.1:1 is particularly suitable for the process according to this invention. Although low molecular weight nylon 6,6 which deviates from the said molar ratio of the terminal groups may be converted by the process according to the invention and in the apparatus according to the invention into high molecular weight nylon 6,6, longer aftercondensation periods are then necessary.

Continuous aftercondensation of nylon 6,6 by the process according to this invention may be accelerated by the use of subatmospheric pressure but there may then easily be the risk that traces of oxygen may penetrate the polymer melt through poorly sealed joints of machine parts so that it is discolored and damaged. Moreover, steam which has been dissolved in the polymer or entrained escapes at higher speed at subatmospheric pressure and then easily carries more polymer melt with it. For the sake of simplicity and reliability in operation it is preferable to carry out aftercondensation at atmospheric pressure in screw extruder reactors which do not have any pressuretight processing zones sealed off from each other.

At atmospheric pressure polycondensation can be accelerated with certain limits by passing over inert gas so that the partial pressure of steam is decreased.

In screw extruder reactors which can be subdivided into a plurality of zones which can be sealed off from one another in a pressuretight manner, for example in twin screw extruders having helically arranged blades of the ZSK type of Werner & Pfleiderer, a higher pressure is advantageously maintained in the first zone so that entrained steam can be withdrawn at a relatively low flow speed, and in the subsequent zones the reaction is carried to completion at atmospheric pressure, subatmospheric pressure or at a pressure which decreases in stages.

The particular advantage of the process according to the invention is that high molecular weight nylon 6,6 is continuously prepared under mild conditions in a self-cleaning screw extruder reactor. A uniform good quality of the end product is thus ensured. Owing to the relatively short residence times and the narrow residence time range in conjunction with the self-cleaning action, thermal damage to the material is excluded. The end product therefore contains no gel-like or cracked constituents.

It is surprising that the aftercondensation should give high molecular weight nylon 6,6 in the self-cleaning closely meshing twin screw extruder reactors used according to the invention in a relatively short time at atmospheric pressure, although degassing of steam from nylon 6,6 in such twin screw extruders having a small radial clearance is hindered rather than promoted. In the partly filled state, a vapor pressure may build up in the individual screw flights which is higher than atmospheric pressure, which delays aftercondensation.

Fibers, moldings, sheeting, film, semifinished goods and the like can be prepared by conventional processing methods from nylon 6,6 prepared in accordance with this invention. Continuously polycondensed nylon 6,6 can be processed more easily in injection molding machines than nylon 6,6 of the same solution viscosity prepared by batch methods, and gives moldings having a finer spherulitic and a better ordered crystalline structure than the latter.

The invention is illustrated by the following examples in which parts and percentages are by weight.

EXAMPLE 1

50 kg. per hour of molten nylon 6,6 having a K value of from 40 to 50 and a molar ratio of amino terminal groups to carboxyl terminal groups of from 0.9:1 to 1:1 and 1.5 kg. per hour of steam are introduced at a temperature of 270° C. into the inlet of a modified self-cleaning twin screw extruder of the ZHS type (Werner & Pfleiderer) which has been heated to 280° C. The screws have a diameter of 130 mm., a lead of 20 mm., a pitch of 25 mm. and a length of 3750 mm. The screws have single flights, rotate in the same direction, are closely meshing and engage in one another so that they clean each other during rotation. Over the outwardly rotating screw (viewed from above) two rectangular degassing orifices are provided, the first being situated 500 mm. downstream of the feed hopper and the second 1560 mm.

upstream of the tip of the screw. The first degassing orifice has a width of 110 mm. and a length of 385 mm. and is provided at its upstream end with a cover plate having a length of 190 mm. which is adjustable in height so that the radial clearance between the cover plate and the profile of the screw is 20 mm. The second degassing orifice has a length of 200 mm., a width of 110 mm. and is not covered. Steam separates from the polymer melt in the first zone of the twin screws and escapes through the first degassing orifice. The low molecular weight nylon 6,6 is uniformly transported in fifteen to twenty minutes with only slight backmixing from the inlet to the outlet of the screw extruder and kept at 280° C. at atmospheric pressure.

Water formed in the aftercondensation is removed in the form of steam from the second degassing orifice. The partial pressure of steam over the degassing equipment is lowered to from 400 to 500 mm. Hg by passing over nitrogen. At a screw speed of 25 r.p.m., nylon 6,6 having a K value of from 70 to 71 is obtained under the said conditions. The extent to which the double screw extruder is filled is 56%, the conveying efficiency 0.34. 0.042 kilowatt hours of energy is used per kg. of nylon produced.

The end product prepared is colorless and can be processed into filaments or threads having good properties as well as into injection moldings. It can be injection molded more easily than nylon 6,6 having the same K value which has been produced by batch methods and gives moldings having a finer crystalline structure than comparable nylon 6,6 produced batchwise.

EXAMPLE 2

The procedure of Example 1 is followed but 40 kg. of nylon 6,6 per hour is passed through the screw extruder reactor, a screw speed of 15 r.p.m. being maintained. A nylon 6,6 is obtained which is colorless and has a K value of 71 to 72. Power input is 0.048 kilowatt hour per kg. of nylon, the degree of filling 72% and the conveying efficiency 0.36.

EXAMPLE 3

The procedure of Example 1 is followed but a product temperature of from 270° to 290° C. is maintained in the screw extruder reactor, 40 kg./hour of nylon 6,6 precondensate being conveyed at 20 r.p.m. Nylon 6,6 having a K value of 69 to 72 is obtained. At 270° C. the degree of filling is 61%, the conveying efficiency 0.32 and the specific power input 0.045 kilowatt hours per kg. of nylon 6,6. At 290° C. the degree of filling is 68%, the conveying efficiency 0.29 and the specific power input 0.05 kilowatt hour per kg. of nylon 6,6.

EXAMPLE 4

4.5 kg./hour of molten nylon 6,6 having a K value of 40 and a molar ratio of amino terminal groups to carboxyl terminal groups of from 0.98:1 to 1:1 is flashed with 0.18 kg./hour of steam at a temperature of 270° to 275° C. into a modified twin screw kneader with helically arranged discs of the ZSK 53 type (Werner & Pfleiderer) which has been heated to 280° C. The processing zone of this twin screw kneader has a length of 36 D (D being the external diameter of the screw) and is provided with kneading discs for about one-third of its length and with screws for two-thirds. Two rectangular degassing orifices are provided over the screw which rotates outwardly (when viewed from above). The first is 8D downstream of the beginning of the processing zone of the screw or 6D downstream of the product feed and the second is 8D upstream of the tip of the screw. The first degassing orifice has a width of 40 mm. and a length of 180 mm. whose upstream end is provided with a cover plate 90 mm. in length which is adjustable vertically in such a way that the radial clearance between the cover plate and the screw profile is 10 mm. The second degassing orifice has a width of 40 mm. and a length of 100 mm. and is completely open.

The starting material is supplied to the screw extruder 20 cm. upstream of the first degassing orifice. The major portion of the steam escapes in a directcion opposite to the direction of conveyance of the screw through the first degassing opening; steam formed by aftercondensation escapes through the second degassing orifice. In order that oxygen may be excluded reliably, the degassing orifices are flushed with nitrogen. The molten polymer passes through the processing zone with a mean residence time of twenty minutes and is extruded in the form of a wire. Nylon 6,6 having a K value of 70 is obtained at a temperature of 280° C. in the processing zone, a screw speed of 50 r.p.m. and atmospheric pressure at the degassing orifices. After the nylon 6,6 filament has been extruded, it is cooled in a water bath and then cut up into granules. The nylon 6,6 prepared is colorless and entirely free from inhomogeneities and specks of dirt.

As will be seen from the above examples, the process provides an increase in molecular weight which is at least 19 K value units higher than the intial K value of the initial polyamide.

We claim:

1. A process for continuous aftercondensation of low molecular weight polyhexamethylene adipamide having a K-value of 30 to 60 and a molar ratio of amino terminal groups to carboxyl terminal groups of from 0.5:1 to 1.2:1, said K-value being determined according to H. Fikentscher, Cellulosechemie, 13 (1932), 58, in a screw extruder reactor which comprises heating said molten low molecular weight polyhexamethylene adipamide in the presence of from 1 to 10% by weight of steam in a self-cleaning, closely meshing screw extruder reactor for from five to forty-five minutes at from 270° to 285° C. at a pressure of from 50 mm. Hg to 2 atmospheres gauge and a power input through the screws of from 0.02 to 0.2 kilowatt hour per kilogram of polyhexamethylene adipamide to obtain polyhexamethylene adipamide having a molecular weight which is at least 19 K-value units higher than said low molecular weight polyhexamethylene adipamide.

2. A process as claimed in claim 1 said low molecular weight polyhexamethylene adipamide having a K value of from 40 to 55.

3. A process as claimed in claim 2 wherein said screw extruder reactor is a twin screw extruder reactor, rotating said screws in the same direction, maintaining a radial clearance of less than 3 mm. between the screw lands and the screw barrel, and discharging said steam through at least one orifice in the reactor above the screw which rotates away from the space swept by the two screws, said orifice lying above the upper intersection of the two circles provided by the projections of the screws on a plane perpendicular to the screw axes.

References Cited

UNITED STATES PATENTS

| 2,361,717 | 10/1944 | Taylor | 260—78 R |
|---|---|---|---|
| 3,253,892 | 5/1966 | Brignac et al. | 260—78 R |
| 3,257,173 | 6/1966 | Parnell | 23—285 |
| 3,040,005 | 6/1962 | Bernhardt et al. | 260—78 |
| 3,260,703 | 7/1966 | Coggeshall | 260—78 |
| 3,496,149 | 2/1970 | Tsonawaki et al. | 260—78 |

HAROLD D. ANDERSON, Primary Examiner

U.S. Cl. X.R.

18—12 SN; 260—96 R